UNITED STATES PATENT OFFICE.

JAMES FRANK LOSTUMO AND AUGUST H. OLANDER, OF CHICAGO, ILLINOIS.

METHOD OF RECOVERING MATERIALS FROM PAINT.

1,279,888. Specification of Letters Patent. Patented Sept. 24, 1918.

No Drawing. Application filed February 11, 1918. Serial No. 216,585.

*To all whom it may concern:*

Be it known that we, JAMES FRANK LOSTUMO and AUGUST H. OLANDER, citizens of the United States of America, and residents of Chicago, county of Cook, and State of Illinois, have invented certain new and useful Improvements in Methods of Recovering Materials from Paint, of which the following is a specification.

This invention relates to paints, oils, and kindred substances and more particularly to the recovery of paint and paint materials from "paint-skins" and paint remnants, and accumulations on the sides of paint tanks, etc., which have become more or less hardened or dried, and which are ordinarily wasted, for lack of efficient and inexpensive means of recovery.

The main objects of the invention are to treat such paint-skins and kindred materials as are ordinarily lost or wasted, so as to recover the useful constituents in a manner adapted for re-using in the manufacture of appropriate products, particularly paint, and to provide efficient methods and means for accomplishing this economy.

The method of this invention is to collect the paint-skins and other materials from which recovery is to be made and to mix same with a suitable solvent, such for instance as varnish-remover, alcohol, creosote, and kerosene either separately or in various combinations, preference being in the order enumerated. After the materials referred to are sufficiently softened the oil content is saponified by adding alkali and water, common lye being adapted for the purpose. The solid material is thus precipitated and may be separated, preferably mechanically by any convenient gravity means, as for instance by a settling tank or a centrifuge. After the solid matter is separated it is reduced to a fine homogeneous pasty mass, for which purpose an ordinary paint-mill may be used. This solid matter is then mixed with suitable oil in sufficient proportions to make a useful paint of proper consistency, linseed oil being best adapted for the purpose.

If desired the moist solid material may be dried and kept, preferably in powdered form, ready for mixture with oil whenever its use may be required for making paint.

The process may be illustrated by a typical instance as follows: A quantity of paint refuse, mainly paint-skins is placed in a tank and solvent material is added, namely wood alcohol and a certain paint and varnish-remover which is known commercially as "X-cell-all," the composition of which is described in United States Patent No. 714,880 of December 2, 1902, though we may use other makes, the precise composition not being essential. This is permitted to stand until the paint matter is thoroughly softened, requiring usually from two to six days. Then kerosene and creosote oil are added and the whole mass is stirred to a uniform fluid consistency. Then lye and water are added, four ounces of lye being used to a gallon of water. In a short time the solid matter is precipitated and is then separated and run through a paint-mill. The solid matter is then mixed with linseed oil and stored ready for use as paint. The color may of course be adjusted by adding suitable pigments.

The proper treatment of twenty-five gallons of ordinary dry paint-skins requires about one gallon of varnish-remover, one gallon of alcohol, three gallons of creosote, two gallons of kerosene, and one gallon of the alkaline solution.

Although we have herein specified a certain preferred sequence of steps and certain apparatus, materials, and proportions it is to be understood that some of same may be omitted or varied without departing from the spirit of our invention as defined by the following claims.

We claim:

1. The method of treating paint refuse which consists in saponifying the oil content and then separating the solids therefrom by any gravity process.

2. The method of treating paint refuse which consists in saponifying the oil content, then separating the solids therefrom by any gravity process, then grinding the solids to a fine homogeneous consistency, and finally adding oil in sufficient proportion to produce a useful paint.

3. The cold treatment method of recovering paint materials from paint-skins, which consists in soaking the paint-skins in any available paint solvent, and then adding lye and water and subsequently grinding in a paint-mill.

4. The method of treating paint which has become more or less dried and hardened, which consists in applying a solvent and thereby softening same, then adding lye and water sufficient to saponify the oils and precipitate the pigments, and then separating the solid and liquid materials.

5. A method of treating paint skins which consists in saponifying the oil content and then separating the solids therefrom by permitting the mixture to stand in a settling tank.

Signed at Chicago this 8th day of February, 1918.

JAMES FRANK LOSTUMO.
AUGUST H. OLANDER.

Copies of this patent may be obtained for five cents each, by addressing the "Commissioner of Patents, Washington, D. C."